Feb. 13, 1968 R. O. DUNN 3,368,365
SEPARATION OF CHLORONITROBENZENE ISOMERS BY
CRYSTALLIZATION AND FRACTIONATION
Original Filed Dec. 13, 1965
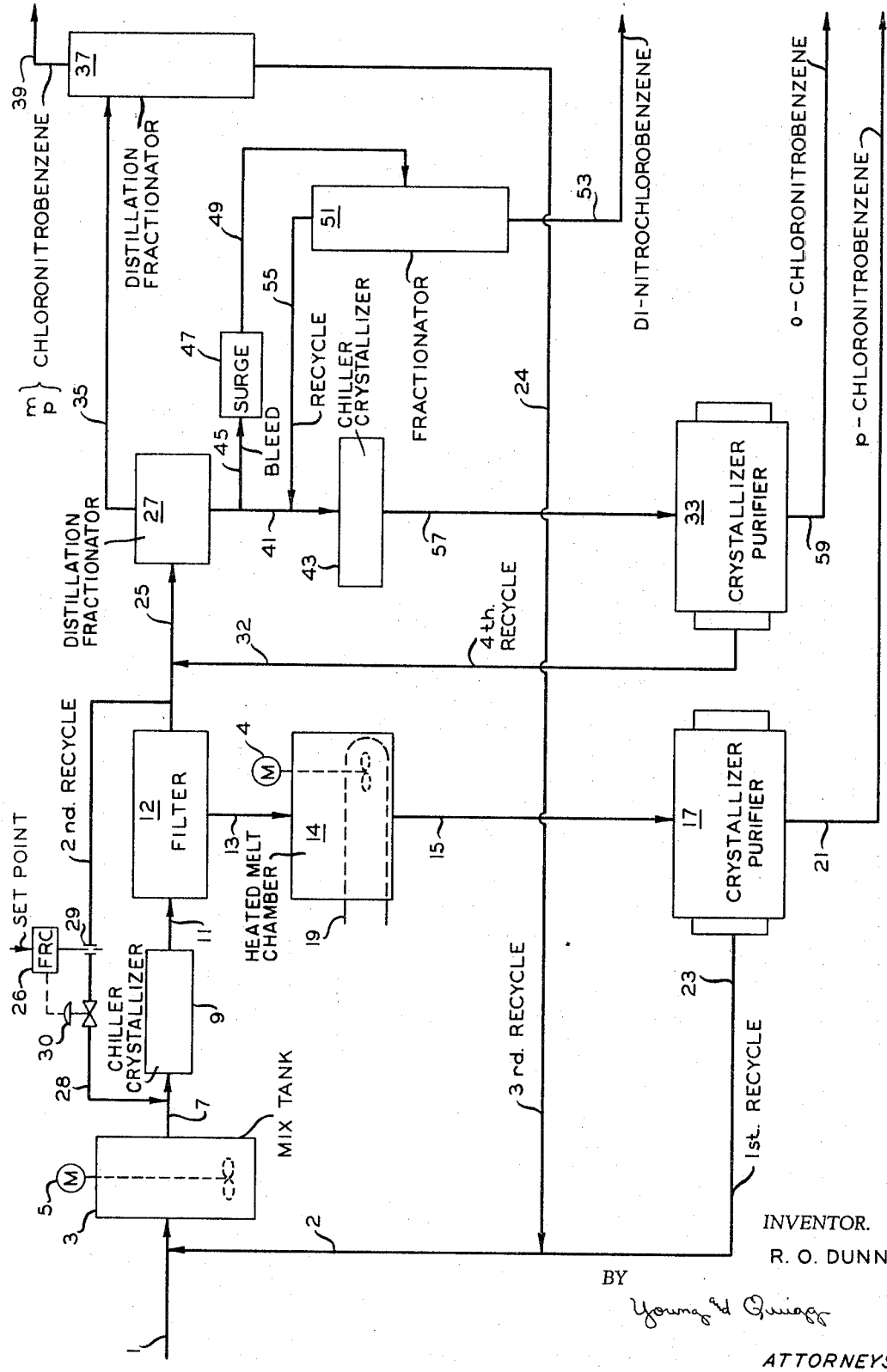
INVENTOR.
R. O. DUNN
BY
Young ed Quigg
ATTORNEYS

United States Patent Office 3,368,365
Patented Feb. 13, 1968

3,368,365
SEPARATION OF CHLORONITROBENZENE ISOMERS BY CRYSTALLIZATION AND FRACTIONATION
Robert O. Dunn, Bartlesville, Okla., assignor to Phillips Petroleum Company, a corporation of Delaware
Original application Dec. 13, 1965, Ser. No. 513,225. Divided and this application Dec. 22, 1966, Ser. No. 603,950
5 Claims. (Cl. 62—123)

ABSTRACT OF THE DISCLOSURE

Ortho and para forms of chloronitrobenzene are separated first by chiller crystallization to obtain a mother liquor rich in the ortho form. The mother liquor is then fractionally distilled, the bottoms of which is fractionally crystallized to obtain a pure ortho form and the overhead is fractionally redistilled.

This is a division of application Ser. No. 513,225, filed Dec. 13, 1965, now Patent No. 3,311,666.

This invention relates to separating isomers of chloronitrobenzene. In one of its aspects, this invention relates to the formation of separate streams of high purity o-chloronitrobenzene and p-chloronitrobenzene by a combination of crystallization and fractionation.

The industry is very interested in obtaining in pure form the para and ortho isomers of chloronitrobenzene. These isomers have particular utility as chemical intermediaries in various processes and heretofore have been very difficult to obtain because their separation by distillation is extremely difficult due to the close proximity of their boiling points.

The various isomers of chloronitrobenzene have the following boiling and freezing points:

| Compound | B.P. ° C. | F.P. ° C. |
|---|---|---|
| o-Chloronitrobenzene | 246 | 32.5 |
| p-Chloronitrobenzene | 242 | 83.5 |
| m-Chloronitrobenzene | 236 | 44.5 |
| di-Nitrochlorobenzene | 315 | 36.3 |

From these data, it can be seen that separation by distillation of the para and ortho isomers would be extremely difficult if not impossible. In like manner, crystallization does not offer a feasible means for complete separation of these components into their pure form because at a temperature of 14° C. a mixture containing p-chloronitrobenzene and o-chloronitrobenzene forms a binary eutectic mixture having a composition of 33.5 weight percent p-chloronitrobenzene and 66.5 weight percent o-chloronitrobenzene. From a mixture of these isomers, only one component is readily separated in pure form by crystallization, depending on the composition of said mixture. To illustrate: Maximum recovery of p-chloronitrobenzene from a mixture comprising on a weight basis 66 percent para, 32 percent ortho, 1 percent meta and 1 percent di-nitrochlorobenzene is obtained by cooling to 14° C. with a 32 percent yield of the contained p-chloronitrobenzene as crystals. If cooled below 14° C., crystals of ortho and para isomers would be formed. After removal of the para crystals, the filtrate is fractionated to provide a stream having the following composition on a weight basis: 14.7 percent para, 81.5 percent ortho, 0.1 percent meta and 3.7 percent di-nitrochlorobenzene. This mixture is now on the ortho side of the eutectic and is chilled to aproximately 14° C. to obtain a 40 percent yield of the contained o-chloronitrobenzene as crystals.

By operating in this manner the need of a eutectic depressant is eliminated. It is known that eutectic depressants have been proposed in extractive crystallization procedures in order to take the mixture to the other side of the normal eutectic point, followed by removing the depressant and then crystallizing the mixture. The big disadvantage with such procedures is that the depressant is often difficult to remove and results in an impure product. The method described hereinafter eliminates the need for incorporation of any depressant and therefore results in production of isomers in their pure form which are desired by the chemical industry.

It is therefore an object of this invention to provide a method for increasing the amount of p- and o-chloronitrobenzene which can be recovered in high purity from a mixture of m-, p-, o-chloronitrobenzenes and di-nitrochlorobenzene without the use of eutectic depressants.

Another object of this invention is to provide a method of separating a mixture of m-, p-, o-chloronitrobenzenes and di-nitrochlorobenzene into separate streams of high purity.

Other objects and many of the attendant advantages of this invention will be readily appreciated as the same becomes better understood by reference to the following detailed description.

Briefly this invention comprises the steps of forming a stream comprising a mixture of the isomers of chloronitrobenzene, wherein the ratio of the para isomer to the ortho isomer is greater than 33.5 to 66.5, cooling the mixture to approximately 14° C. wherein p-chloronitrobenzene is crystallized therefrom; removing the para crystals and fractionating the resultant mother liquor to increase the concentration of the ortho isomer in the mixture; and cooling the mixture to approximately 14° C. wherein o-chloronitrobenzene is crystallized therefrom.

This invention will be further described with reference to the drawing in which the sole figure depicts a diagrammatic flow of a stream containing the various isomers of chloronitrobenzene, showing how these isomers are treated according to the invention.

It is to be understood that the weights of constituents are based on a lb./hr. flow rate and percentages on a weight basis. A stream of 5,520 lbs. consisting of 1.0 percent or 55 lbs. of m-chloronitrobenzene, 66.0 percent or 3,642 lbs. of p-chloronitrobenzene, 32.0 percent or 1,768 lbs. of o-chloronitrobenzene and 1.0 percent or 55 lbs. of di-nitrochlorobenzene is fed via conduit 1 to mix tank 3. A first recycle stream (to be more fully described hereinafter) 2 is mixed in tank 3 with the fresh feed. A suitable agitating means 5 is used to agitate the mixture. Effluent from tank 3 is combined with a second recycle stream (to be more fully described below) and the mixture comprising 5.1 percent or 1,602 lbs. of m-chloronitrobenzene, 47.4 or 14,700 lbs. of p-chloronitrobenzene, 46.4 percent or 14,437 lbs. of o-chloronitrobenzene and 1.1 percent or 361 lbs. of di-nitrochlorobenzene is passed via conduit 7 to chiller 9 wherein the mixture is cooled to approximately 14° C. The resulting slurry containing approximately 20 percent solids is passed via conduit 11 to a suitable filter or centrifuge 12, such as those described on pages 189 to 201 of Advances in Petroleum Chemistry and Refining, volume I, by Kobe and McKetta, Interscience Publishers, 1958, wherein the mixture or the slurry is separated into a mother liquor stream of eutectic composition and a cake comprising about 80 percent p-chloronitrobenzene.

A chilling device useful in the method of this invention can be a scraped-surface device operated with chilled water or other refrigerant on the coolant side. The cake containing 69 percent solids is filtered from the mother liquor and passed via conduit 13 to a melt tank 14 whereby it is partially melted to 40 percent solids through the introduction of heat from means 19 into the tank 14, to provide a pumpable crystal slurry for introduction into crystal purifier 17. The temperature in tank 14 is maintained at about 135° C. under a pressure of 5 p.s.i.g. A total of 8,960 pounds of crystal slurry containing 7,158 lbs. of p-chloronitrobenzene is removed from melt tank 14 and passed via conduit 15 to crystal purifier 17. The operation and description of this crystal purifier is described in Patent 3,067,270 and it is to be understood that the purifier used in this embodiment is the same as that described in said patent.

The para isomer product consisting of 3,583 lbs. of p-chloronitrobenzene (99.0 percent purity), 4 lbs. or 0.1 percent of m-chloronitrobenzene and 32 lbs. or 0.9 percent p-chloronitrobenzene and 1 lb. of di-nitrochlorobenzene, is removed via conduit 21 and passed to storage, not shown. Mother liquor totaling 5,340 lbs. of the composition consisting of 172 lbs. or 3.2 percent of m-chloronitrobenzene, 3,575 lbs. or 67.0 percent of p-chloronitrobenzene, 1,554 lbs. or 29.1 percent of o-chloronitrobenzene and 39 lbs. or 0.7 percent of di-nitrobenzene is recycled from column 17 via conduit 23 where it joins a third recycle stream (to be discussed hereinafter) passing via conduit 24 and the combined recycle streams are passed via conduit 2 and combined with the feed in conduit 1.

Twenty-two thousand one hundred forty lbs. of mother liquor consisting of 1,426 lbs. or 6.4 percent m-chloronitrobenzene, 7,542 lbs. or 34.1 percent p-chloronitrobenzene, 12,851 lbs. or 58.0 percent o-chloronitrobenzene and 321 lbs. or 1.5 percent di-nitrochlorobenzene is removed from filter or centrifuge 12 and divided with 18,818 lbs. recycled as above-mentioned second recycle stream 28 and the remaining 3,322 lbs. combined with a fourth recycle stream 32 and the combined passed to fractionator 27 via conduit 25. (In this example, a 200 tray fractionator is used.) Sufficient mother liquor is recycled to maintain approximately 20 weight percent solids in the slurry passing to filter 12. In this example, the set point on flow regulator controller 26 is fixed to recycle about 85 percent of the mother liquor via conduit 28 by manipulating valve 30 in response to a signal received from pressure orifice 29. Such a control device is well known in the art.

Fractionator 27 operates under 5 p.s.i.a. pressure and has a temperature at the top tray of 275° F. with a temperature at the bottom tray of 300° F.

An overhead stream weighing 1,520 lbs. and consisting of 221 lbs. or 14.6 percent of m-chloronitrobenzene, 1,116 lbs. or 73.4 percent of p-chloronitrobenzene, 183 lbs. or 12.0 percent of o-chloronitrobenzene, passes via conduit 35 to a second fractionating zone 37.

In this fractionating zone a 23 tray fractionator is used. This fractionator also operates under a 5 p.s.i.a. pressure and a top temperature of 275° F. with a bottom temperature of 300° F.

Ninety-eight lbs. of overhead from fractionating zone 37 and consisting of 51 lbs. or 52 percent m-chloronitrobenzene, 46 lbs. or 47 percent p-chloronitrobenzene and 1 lb. or 1 percent o-chloronitrobenzene, is passed via conduit 39 to an isomerization unit (not shown). Effluent from the isomerization zone, enriched in para, is passed to tank 3 for production of additional para isomer.

Four thousand two hundred eighty-five lbs. of bottom product consisting of 6 lbs. or 0.1 percent m-chloronitrobenzene, 630 lbs. or 14.7 percent p-chloronitrobenzene, 3,491 lbs. or 81.5 percent o-chloronitrobenzene, and 158 lbs. or 3.7 percent di-nitrochlorobenzene is passed from the bottom of fractionator 27 via conduit 41 to a second chilling zone 43.

A portion of the stream in conduit 41 is continuously bled via conduit 45 to a surge tank 47. When surge tank 47 fills, the contents are passed to a batch distillation for removal of di-nitrochlorobenzene isomer. A batch distillation is used because this compound is highly explosive and has to be handled with great care. When tank 47 is full, the contents are passed via conduit 49 to a fractionating zone 51 where the di-nitrochlorobenzene is removed as a kettle product via conduit 53 and the overhead is recycled back to conduit 41 via conduit 55 downstream of take-off conduit 45. It is to be understood that this bleed of line 41 is to rid the system of the small amounts of di-nitrochlorobenzene that are present in the system.

It will be noted that the ratio of p-chloronitrobenzene to o-chloronitrobenzene in stream 41 has been changed significantly and that the mixture is now on the ortho side of the eutectic mixture. Therefore, it is now possible to separate relatively pure ortho from the mixture. In order to remove the maximum amount of o-chloronitrobenzene, the mixture is chilled in zone 43 to approximately 14° C.

The slurry in line 57 weighs 4,226 lbs. consisting of 6 lbs. or 0.1 percent of m-chloronitrobenzene, 629 lbs. or 14.7 percent of p-chloronitrobenzene, 3,486 lbs. or 82.7 percent of o-chloronitrobenzene, and 105 lbs. or 2.5 percent of di-nitrochlorobenzene is passed via conduit 57 to a second crystal purification zone 33 wherein 1,743 lbs. of product consisting of 12 lbs. or 0.7 percent of p-chloronitrobenzene, 1 lb. or 0.1 percent of di-nitrochlorobenzene and 1,730 lbs. or 99.2 percent of o-chloronitrobenzene is removed via conduit 59 and passed to storage, not shown.

Two thousand four hundred eighty-three lbs. of mother liquor from crystallizer 33 consisting of 6 lbs. or 0.2 percent m-chloronitrobenzene, 617 lbs. or 24.8 percent p-chloronitrobenzene, 1,756 lbs. or 70.8 percent o-chloronitrobenzene and 104 lbs. or 4.2 percent di-nitrochlorobenzene is passed via line 32 and combined as above-mentioned fourth recycle stream with the material flowing in conduit 25 prior to entering fractionating zone 27.

One thousand four hundred twenty-two lbs. of kettle product, consisting of 170 lbs. or 12.1 percent of m-chloronitrobenzene, 1,070 lbs. or 74.9 percent of p-chloronitrobenzene, 182 lbs. or 12.8 percent of o-chloronitrobenzene from the second fractionating zone 37 is recycled via conduit 24 and combined with the stream flowing in the recycle line 23 and passed via conduit 2 to be combined as above-mentioned first recycle stream with the fresh feed in conduit 1.

This invention has been described in a preferred embodiment. The pressure, temperatures, etc., are not to be considered limiting but are typical for the particular system. Those skilled in the art can readily determine column requirements for making the required separations and will know that equivalent distillation means, such as packed columns, can be substituted for the tray columns described. Filtering means, other than those shown, are readily substituted by those skilled in the art. If the composition of the feed stream in conduit 1 is such that during the initial operation of the system the mixture passing to chiller 9 contains less p-chloronitrobenzene than the eutectic composition no p-chloronitrobenzene can be crystallized by chilling. In this event, the feed is passed direct to fractionator 27 wherein the ratio of p-chloronitrobenzene to o-chloronitrobenzene in recycle conduits 24 will be increased until the feed in conduit 1 does contain more p-nitrochlorobenzene than the eutectic mixture.

Obviously, many modifications and variations of the present invention are possible in the light of the above teachings. It is therefore to be understood that within the scope of the appended claims the invention may be practiced otherwise than as specifically described herein.

What is claimed is:

1. Apparatus suitable for separating substantially pure isomers from a mixture of isomers in mother liquor feed mixture comprising in combination a chiller means for chilling said feed mixture to about the eutectic point of said mixture; a filter means in fluid communication with said chiller for removing a first solid isomer from said feed mixture and a resulting mother liquor stream; a first purification column means connected to said filter for purifying said first isomer to a substantially high purity; a first fractionator means in fluid communication with said filter for separating the said resulting mother liquor into an overhead stream rich in said first and second isomer and a bottom third isomer rich stream; a second chiller means in fluid communication with said first fractionator for cooling said third isomer rich stream to about the eutectic point of the mixture comprising the mother liquor; and a second purification column means in fluid communication with said second chiller for purifying said third isomer to a substantially high purity.

2. Apparatus according to claim 1 including control means in fluid communication and operatively connected to said filter for maintaining approximately 20 percent solids by weight content in said filter.

3. Apparatus according to claim 1 including melting means in fluid communication with said filter for partially melting said first isomer separated in said filter prior to their entry into the first purification column.

4. Apparatus according to claim 1 including a first recycle means for recycling mother liquor from said first purification column to said first chiller; a second fractionator in fluid communication with said first fractionator for separating said second isomer and said first isomer rich stream into a first isomer rich bottom stream and a second isomer and first isomer rich effluent; second recycling means for recycling said first isomer rich bottom stream to said first chiller; and third recycling means for recycling mother liquor from said second purification column to said first fractionator.

5. Apparatus according to claim 1 including means in fluid communication with a third fractionator for bleeding other components from mother liquor passing to said second chiller from said first fractionator.

References Cited

UNITED STATES PATENTS

| | | | |
|---|---|---|---|
| 2,816,938 | 12/1957 | Hess | 62—58 |
| 3,067,270 | 12/1962 | Weedman | 62—58 |
| 3,177,264 | 4/1965 | Buchsbaum | 203—48 |
| 3,216,833 | 11/1965 | McKay | 62—58 |
| 3,269,923 | 8/1966 | Roche | 203—48 |
| 3,309,289 | 3/1967 | Messina | 203—48 |

NORMAN YUDKOFF, *Primary Examiner.*